March 15, 1932.  A. F. DADDYSMAN  1,849,912
PACKING CONSTRUCTION AND SEAL TUBE
Filed March 28, 1927
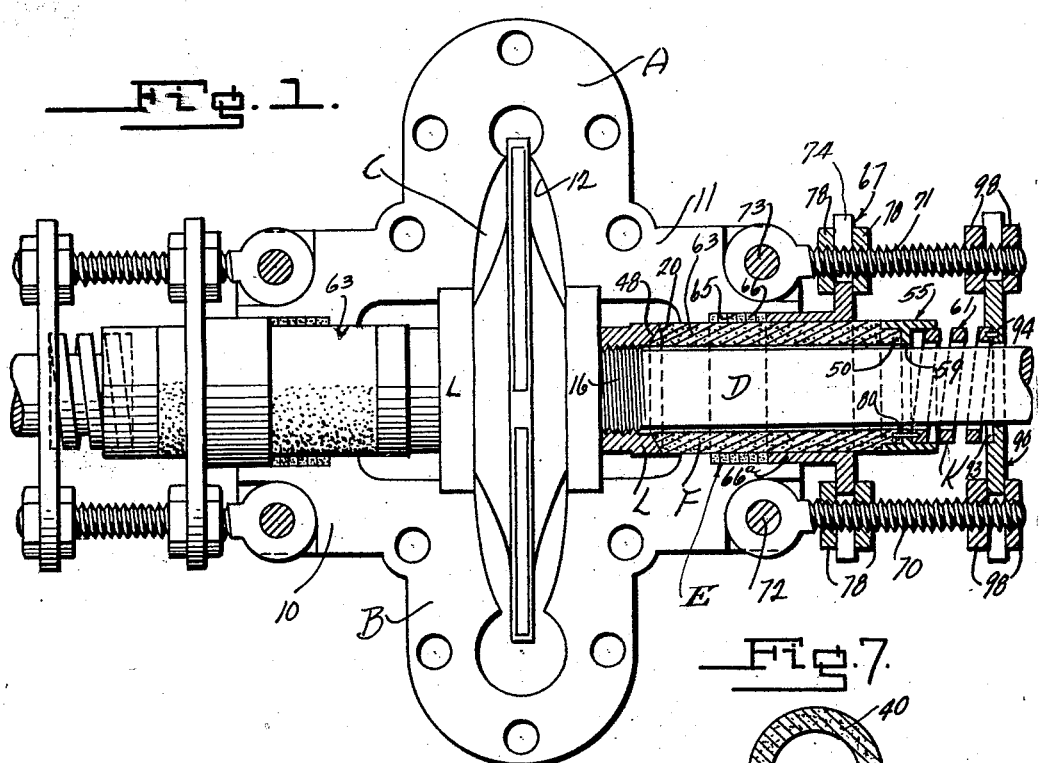
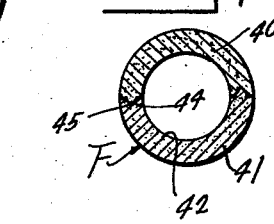
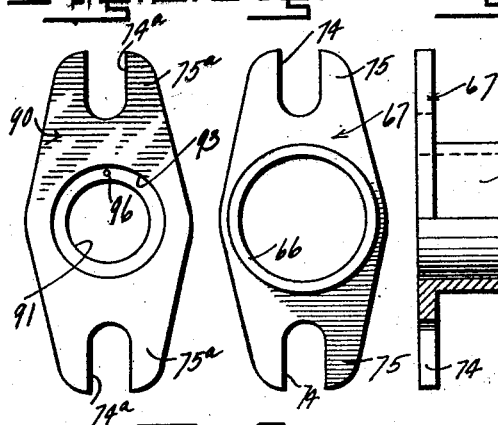
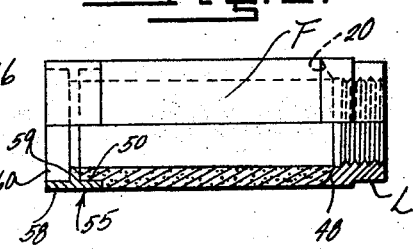
Inventor
Alonzo F. Daddysman
By Lancaster and A. Levine
Attorneys Patented Mar. 15, 1932

1,849,912

UNITED STATES PATENT OFFICE

ALONZO F. DADDYSMAN, OF CHARLESTON, WEST VIRGINIA, ASSIGNOR, BY MESNE ASSIGNMENTS, TO M. R. THOMAS, OF CHARLESTON, WEST VIRGINIA

PACKING CONSTRUCTION AND SEAL TUBE

Application filed March 28, 1927. Serial No. 179,032.

This invention relates to improvements in packing constructions.

The primary object of this invention is the provision of an improved packing and carbon graphite seal tube or sleeve construction, adapted for use in connection with centrifugal pumps or turbines, for the purpose of providing an efficient seal; rendering the sealed connection self adjusting; withstanding extreme hot or cold temperatures without external cooling or heating expedients; and providing an otherwise efficient sealed connection between a rotary part of the pump or turbine, such as the rotary shaft, and the casing, which will obviate constant attention and maintenance.

Other objects and advantages of this invention will be apparent during the course of the following detailed description.

In the accompanying drawings, forming a part of this specification, and wherein similar reference characters designate corresponding parts throughout the several views, Figure 1 is a fragmentary view partly in section showing the improved carbon graphite sleeve in a sealed relation within a pump casing.

Figures 2, 3, and 4 are views of details of the invention.

Figure 5 is a view partly in section showing the carbon graphite tube or sleeve and the associated details thereof.

Figure 6 is a side elevation of a spring, partly in section, used for urging the sleeve or tube of Figure 5 in a sealed relation.

Figure 7 is a transverse sectional view taken across the carbon graphite tube or sleeve.

In the drawings, wherein for the purpose of illustration is shown only a preferred embodiment of the invention, the letter A may generally designate a centrifugal pump, although the invention, insofar as the application of the carbon graphite sleeve or tube is concerned, may be a turbine, or other piece of mechanism; the carbon graphite sleeve or tube being susceptible of use wherever packing is used surrounding a rotary part. In the illustration the turbine A includes the casing B within which an impeller C is rotatably positioned, operated by means of a rotary shaft D connected therewith. Packing means E is provided associated with the casing B and a novel carbon graphite sealing ring F; means K operating upon the tube F to maintain the same in an operative sealed relation with a part L which is preferably rotatable with the shaft D.

The casing B of course includes the bearing extensions 10 and 11, and has therein a compartment 12 wherein the impeller C is rotatably mounted. The rotary shaft D of course is connected with the impeller C, and any suitable means (not shown) for driving the shaft D. The ends of the shaft D at opposite sides of the impeller C extend through the bearing extensions 10 and 11 of the casing B, and at opposite sides of the impeller C thrust collars L may be provided in a screw threaded connection at 16 with the shaft D to hold the impeller C on the shaft D for rotation therewith. As is well known in the art the collars L are provided to hold the impeller C in position, and in the present invention the thrust collars L are formed of a ductile and non-corrosive metal, such as hereinafter mentioned, and the outer annular edge 20 surrounding the shaft D and facing away from the impeller is preferably beveled, sloping in a convergent relation towards the impeller C; the surface 20 being smooth and properly machined to enable a fluid sealed joint connection with the carbon graphite sleeve or tube F in the relation illustrated in the drawing, and to be subsequently mentioned.

The carbon graphite tube or sleeve F preferably surrounds the shaft D, and is located in the passageway through the bearing extension 10 or 11 of the casing B. The carbon graphite sleeve or tube F is preferably of sectional construction, comprising the half-cylindrical or segmental sections 40 and 41, which are complementary, and when in position provide the sleeve or tube F defining a passageway 42 therethrough, thru which the shaft D freely extends. In order that the sections 40 and 41 will be retained in a true concentric relation, it is preferred that each section along one longitudinal edge thereof be provided with a rib 44, triangular in cross section, adapted to fit into a groove 45 along the facing edge of the other section, so that each section along one edge is provided with the rib 44 and along the other edge with the groove 45, making the sections 40 and 41 products of the same mould. The tube sections are tapered at one end edge thereof, as illustrated at 48 in Figure 1 of the drawings, for a seating sealed fit against the tapered edge 20 of the thrust collar L, and at the opposite ends thereof the sections of the tube are provided with reduced flanges defining the reduced annular flange 50, positioned exteriorly of the casing B for receiving thereon a spring seating cap, sleeve, or member 55, preferably formed of a ductile and non-corrosive metal, such as hereinafter mentioned. The construction of the cap or member 55 is well illustrated in Figures 1 and 5 of the drawings, as consisting of a cylindrical shaped body portion 58, having an internal annular flange 59 substantially midway between the ends of the body portion 58, against which the end edge of the reduced flange 50 of the carbon graphite sleeve or tube F abuts in a limiting relation. At the opposite end the cap or member 55 provides a socket or seat 60 adapted to receive an end of the spiral compression spring 61 constituting part of the means K, and to be subsequently described.

The sleeve or tube F extends thru the passageway 63 of the extension 10 or 11, as the case may be; and within the compartment of the housing or casing B the tapered end of the sleeve F seats in a sealed relation against the beveled seat 20 of the collar L. Within the extensions 10 and 11, the same are counter-bored or recessed to provide seats 65 wherein spiral packing 66, or any approved packing, may be positioned, operated upon by a sleeve portion 66ª of a gland 67, so as to be compressed into a sealing relation between the extension 10 or 11 and the carbon graphite sleeve or tube F, as illustrated in Figure 1.

As to the means for maintaining the gland 67 in a compressing engagement with the packing material 66, it is preferred to provide screw threaded stems 70 and 71, preferably pivoted at 72 and 73 respectively on the casing B, adapted to extend through recesses 74 provided in flanged ends 75 of the gland 67; adjusting nuts 78 being threaded on the stems 70 and 71 at opposite sides of the gland flanges 75, to adjustably urge the gland 67 into or away from compressing relation with the packing 66.

More specifically referring to the means K, the same includes the spiral spring 61, which has been mentioned as seated in the socket end 60 of the metal cap 55 of the carbon graphite sleeve or tube F; the said end of the spring 61 which seats in the cap 55 being connected therein against rotation by means of a dowel pin 80, which extends transversely through the annular flange 69, and extends into a recess 81 provided in the end of the spring 61 which seats in the cap; said dowel pin 80 also extending at its opposite end into a suitable recess provided in a section of the carbon graphite tube or sleeve F, as illustrated in Figure 1, and thus holding the cap 55 in position against rotation relative to the carbon graphite tube or sleeve F, and also holding the spring 61 against relative rotation in its seat.

The means K furthermore may comprise a plate or member 90, having an opening 91 therethrough for freely receiving the end of the shaft D therethrough. A socket or seat 93 is counter-recessed in the spring facing side of the plate or member 90, concentric with the opening 91, and a dowel pin 94 is provided in a connected relation within a suitable socket 95 provided in an end of the spring 61, and also seating in a recess 96 in the counter recess or seat 93, as illustrated in Figure 1. The spring plate 90 is provided with end flanges 75ª recessed at 74ª, through which recesses the shanks 70 and 71 extend; nuts 98 being provided on each of the shanks 70 and 71 at opposite sides of the flanges 75ª for adjustably positioning the plate 90 to secure the desired compression of the spring 61, which as is obvious urges the carbon graphite sleeve or tube F longitudinally into a sealing abutment with the beveled surface 20 of the collar L. It is preferred that the taper or bevel of the surfaces 20 and 48 be at an angle of about 30° to a plane at right angles to axis of the shaft D. It is thus apparent that the screw threaded shanks 70 and 71 serve the dual purpose of adjusting the gland packing and compression spring 61 for urging the carbon graphite sleeve into a sealing relation against the collar L. It is preferred, as illustrated in Figure 1, that the passageway 42 of the sleeve F be of a diameter greater than the external diameter of the shaft D, so as to lie in slightly spaced relation therewith. Of course, as is quite obvious from the drawings, the carbon graphite sleeve F is stationary with respect to the casing B and the spring self adjusts the sealed connection of the sleeve F with the collar L.

While any approved ductile and non-corrosive metal may be used, it is preferred to use a white alloy of high tensile strength and elastic limit, such as set forth in U. S. Patent #811,239, which may also consist of nickel 75%, copper, 23½%, and iron, 1½%, although these proportions may be departed from without substantially departing from the desirable ductility and non-corrosiveness.

It is quite apparent from the foregoing that the means of sealing the casing compartment wherein the impeller operates with respect to the shaft D is novel, and obviates the necessity of providing cooling expedients. The shaft D of course may be supported in any approved relation, as by anti-friction bearings (not shown), and in such instance it is unnecessary to directly support the shaft D in the graphite tube or sleeve F. Due to the material of which the carbon graphite sleeve is formed, the same is rendered self lubricating.

The sections of the sleeve F are rigid and non-flexible, and the constituents are preferably a mixture of crystal carbon, such as coke, with the allotrophic form of carbon, known as graphite, of the proper proportions to give sufficient tensile strength and the desired lubricating qualities to the bushing. A preferred proportion is that of sixty parts of the carbon coke with forty parts of ordinary graphite.

Various changes in the shape, size, and arrangement of parts may be made to the form of invention herein shown and described, without departing from the spirit of the invention or the scope of the claims.

I claim:

1. In a sealing and packing construction the combination of a casing having a passageway therethrough, a shaft rotatable in said passageway laterally of the passageway having an annular collar thereon with an annular shoulder about the collar facing said passageway, a non-rotatable sleeve in said passageway having an edge in annular abutment with said shoulder, the shaft extending through said sleeve, screw threaded shanks on the casing externally of said passageway, packing surrounding said sleeve in the casing passageway, a gland for said packing, nut means adjustable on the screw threaded shanks for adjusting the gland with respect to said packing, a member having an opening through which said shaft extends, means for adjusting the member longitudinally on the shaft towards or away from said sleeve, and spring means compressed between said member and the outer end of the sleeve for urging the latter into abutment with the shoulder about said shaft.

2. In a packing and seal construction of the class described a pump casing having a compartment therein and a bearing passageway therethrough, an impeller rotatable in said compartment, having a shaft extending freely through said passageway, a thrust collar of ductile and non-corrosive metal rigid with the shaft and rotatable therewith in the compartment having an annular beveled shoulder facing the passageway of said casing, a carbon graphite sleeve non-rotatable in said passageway having a beveled shoulder facing in a sealed joint against the beveled shoulder of said thrust collar, packing in the passageway surrounding said carbon graphite sleeve, a gland for said packing, means for adjusting said gland against the packing to compress the same, a ductile and non-corrosive metal cap on the outer end of said carbon graphite sleeve externally of the casing passageway, the same providing a socket, a spring seated in said socket, and means for adjusting the compression of said spring to force the sleeve longitudinally of the shaft into a sealing abutment with said collar.

3. In a sealed bearing for rotary parts the combination of a casing having a passageway therein, a rotatable shaft in said passageway having an annular portion thereabout of ductile and non-corrosive metal providing a shoulder facing endwise of said shaft, a self lubricating carbon graphite sleeve of inherently rigid nature mounted in a leak-proof connection in the passageway, means to adjust said leak-proof connection from exteriorly of the casing, and means adjustable from exteriorly of the casing for resiliently urging said sleeve into a non-rotatable leak-proof engagement with the shoulder on said shaft.

4. In a sealed bearing for rotary parts the combination of a casing having a passageway therein, a rotatable shaft in said passageway having an annular shoulder thereon facing into the passageway, a self lubricating sleeve of inherently rigid nature in the passageway, bolts connected with the casing exteriorly thereof, packing means adjustably associated with said bolts for packing the connection between the casing and exteriorly about said sleeve, and means exteriorly of the casing adjustable on said bolts for resiliently urging said sleeve endwise into the passageway into a non-rotatable leak-proof bearing engagement with said shoulder.

ALONZO F. DADDYSMAN.